Patented Feb. 18, 1930

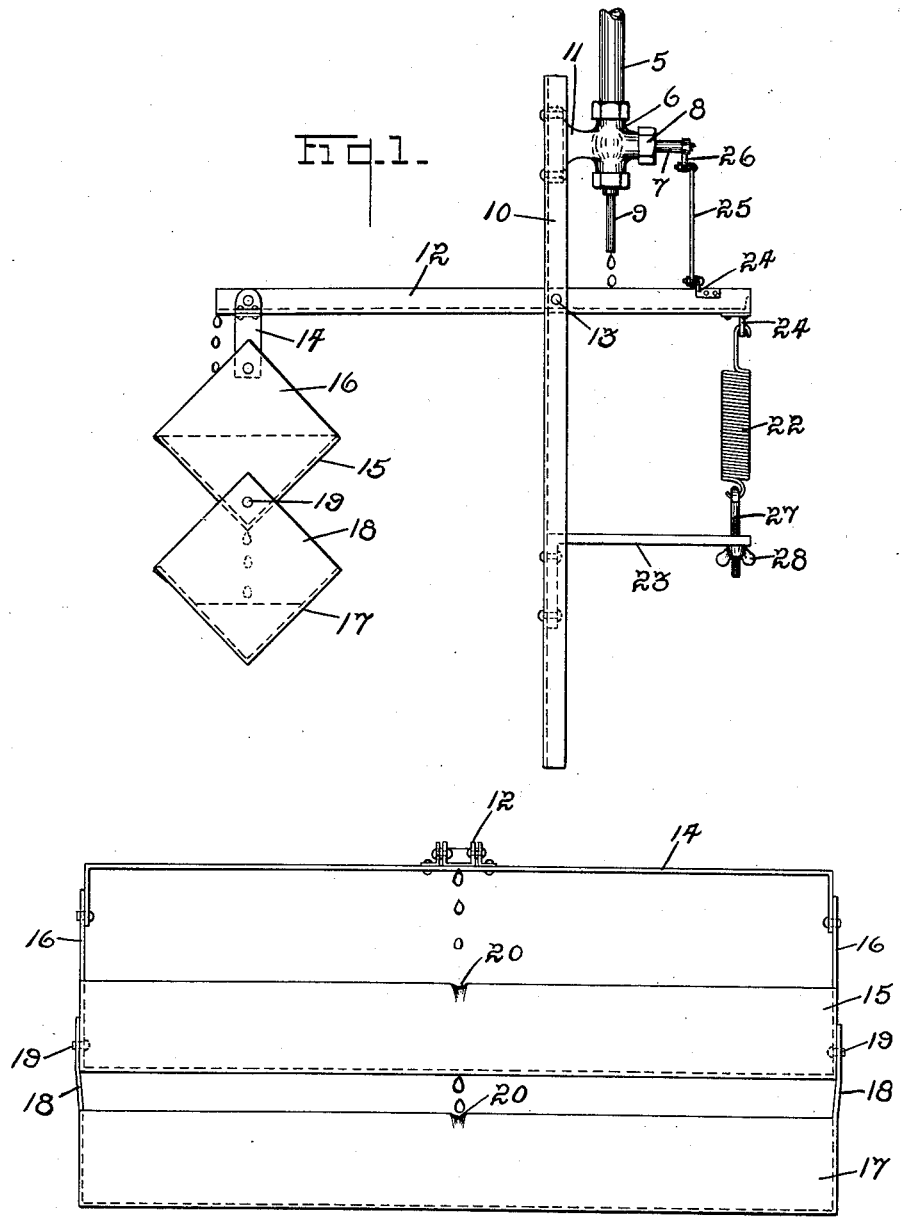

1,747,195

UNITED STATES PATENT OFFICE

KENNETH F. TRIGGS AND WILLIAM D. REDRUP, OF HUNTINGTON, INDIANA, ASSIGNORS TO THE MAJESTIC COMPANY, OF HUNTINGTON, INDIANA, A CORPORATION OF INDIANA

HUMIDIFIER

Application filed November 21, 1927. Serial No. 234,630.

This invention relates to a humidifier, and especially to means for supplying a regulated amount of water thereto. The principal object of the invention, as exemplified by the present construction, is to provide improved means for automatically regulating the amount of water supplied to the humidifier in accordance with the amount of evaporation which takes place. Provision is also made for adjusting the device to vary the amount of water which is contained at one time in the evaporating pans. The humidifier may be connected to any water supply system, and is provided with a valve and a drip device, so that when the valve is opened, water will trickle drop by drop into the pans, until the weight of the water therein is sufficient to close the valve by means provided for that purpose.

The specific construction of the invention, its mode of operation and the advantages resulting therefrom will be more particularly described in connection with the accompanying drawing which illustrates the preferred embodiment thereof.

In the drawing:

Figure 1 is a side elevation of the invention in operative position.

Fig. 2 is a rear elevation of the water pans and the means by which they are supported.

As illustrated in the drawing, the invention may be connected to a water supply line 5, from which water may be supplied, as needed, through a valve housing 6. The stem of the valve 7 extends outwardly from the housing 6 through a packing gland 8. Extending downwardly from the housing 6 is a drip pipe 9 from which water will be discharged drop by drop when the valve is open.

An upright bar 10 is secured adjacent the drip pipe 9 by any suitable means, as for example by riveting the same to a rearward extension 11 of the valve housing. A waterway 12, which may be in the form of a trough or channel, is pivotally connected at 13 to the bar 10 in position to receive the water as it drips from the pipe 9. A bail 14 is pivotally connected to the discharge end of the waterway 12 for supporting a receptacle to receive the water as it is discharged from the waterway 12. This receptacle may consist of one or more units constructed in any suitable manner for retaining the water for evaporation. In the present construction, a pan 15 of triangular shape is used and is provided with upwardly projecting end plates 16 which are connected to the bail 14. A second pan 17 of similar shape has upwardly extending end plates 18 which are pivotally connected at 19 to the ends of the pan 15. Any number of pans may be used and each one is preferably provided on one edge with a notch 20 through which the water may be discharged when the pan is full.

The waterway 12 constitutes a lever, fulcrumed at 13, with the weight of the pans 15 and 17 and their contents tending to rock one end of the lever downwardly while the other end of the lever has an eye 21 secured thereto and connected by a coil spring 22 to a bracket 23 which is secured to the upright 10. This spring 22 exerts a force which tends to counteract the force exerted by the weight of the water pans. An ear 24 is secured to the edge of the lever 12 above the spring 22 and is connected by a link 25 to a crank arm 26 which is secured to the valve stem 7. Thus it will be seen that as the weight of water in the pans 15 and 17 increases there is a greater tendency to overcome the tension of the spring 22 and to rock the lever 12 in a direction to close the valve 7, thus shutting off the supply of water. As soon as a sufficient amount of water has evaporated to permit the spring 22 to restore the lever 12 to its former position, the valve will be opened and more water will be supplied to the pans. The spring 22 is preferably connected to the bracket 23 by means of an eye-bolt 27 having an adjustable nut 28, thereby making it possible to adjust the tension of the spring and to vary the amount of water which may be supplied to the pans before the valve is closed.

The member 12 not only fulfills the function of a lever for controlling the supply of water but also provides the medium by which the water is directed into the pans.

The pans collectively constitute a receptacle from which evaporation may take place. These pans are made preferably from thin copper which naturally heats very easily and thus facilitates the evaporation. By providing several pans, arranged one above the other in the manner described, the expanse of water surface from which evaporation may take place is greatly increased without taking up an excessive amount of space.

Instead of the spring 22 any other equivalent counterbalancing means may be used. It will also be apparent that the size and shape of the pans, as well as other details of construction, may be considerably modified without any material departure from the scope of the invention as defined in the claim.

What we claim is:

In a humidifier, the combination of a plurality of trough-shaped pans, arranged one below the other so that the lower pan receives the overflow from the next one above, each of said pans having end plates with portions extending upwardly, said portions on the lower pan being pivoted to the ends of the pan next above, a bail pivoted to the upwardly extending portions on the uppermost pan, whereby all of the pans are suspended, a waterway on which the bail is hung, said waterway discharging into the uppermost pan, means for supplying water to said waterway, and means dependent upon the amount of water in said pans for controlling said supply means.

In testimony whereof, we have hereunto signed our names to this specification.

KENNETH F. TRIGGS.
WILLIAM D. REDRUP.